Figure 1:
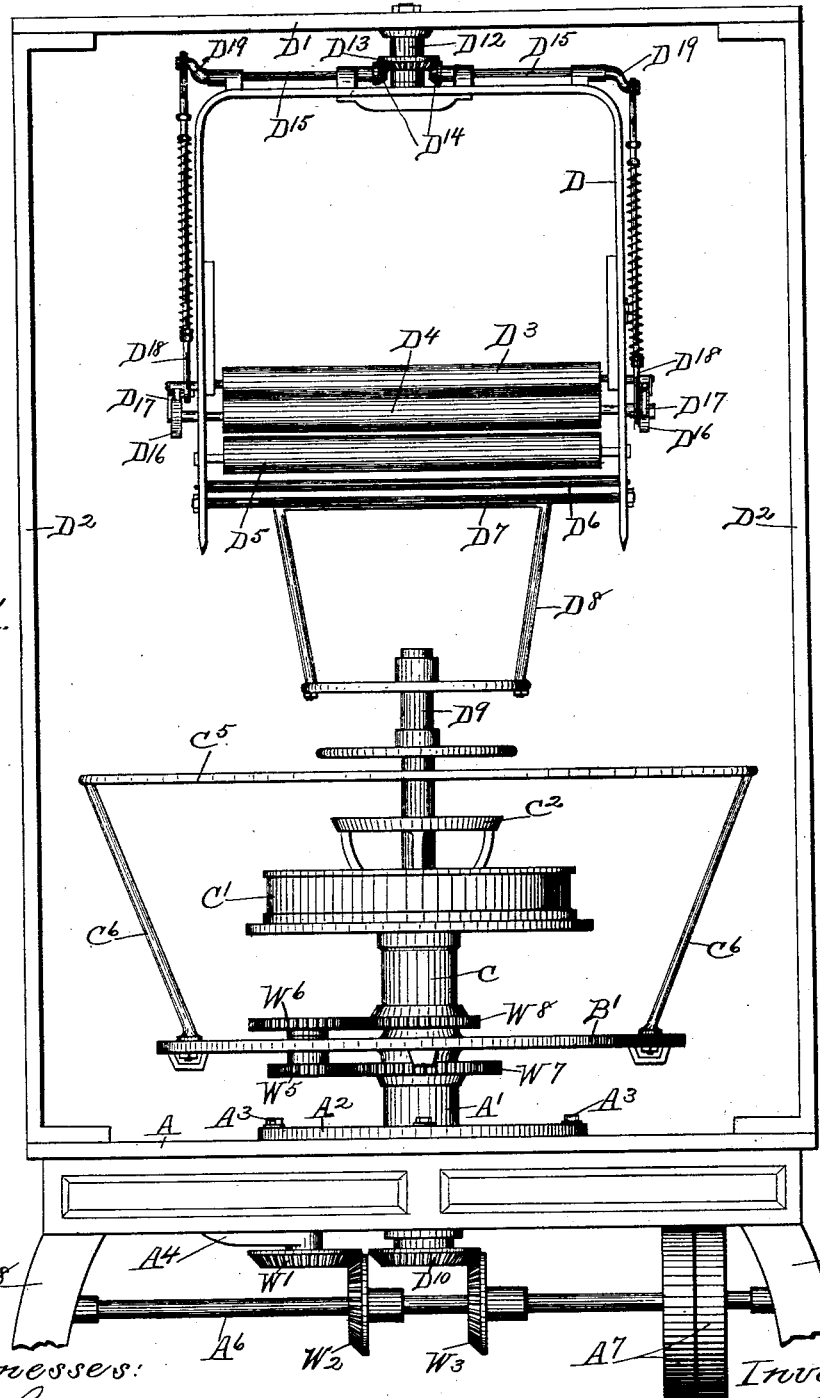

(No Model.)   2 Sheets—Sheet 1.

R. W. GORMLY.
KNITTING MACHINE.

No. 587,957.  Patented Aug. 10, 1897.

Witnesses:
G. H. Curtis
J. G. Curtis

Inventor:
Robert W. Gormly
By Mosher & Curtis
Attys.

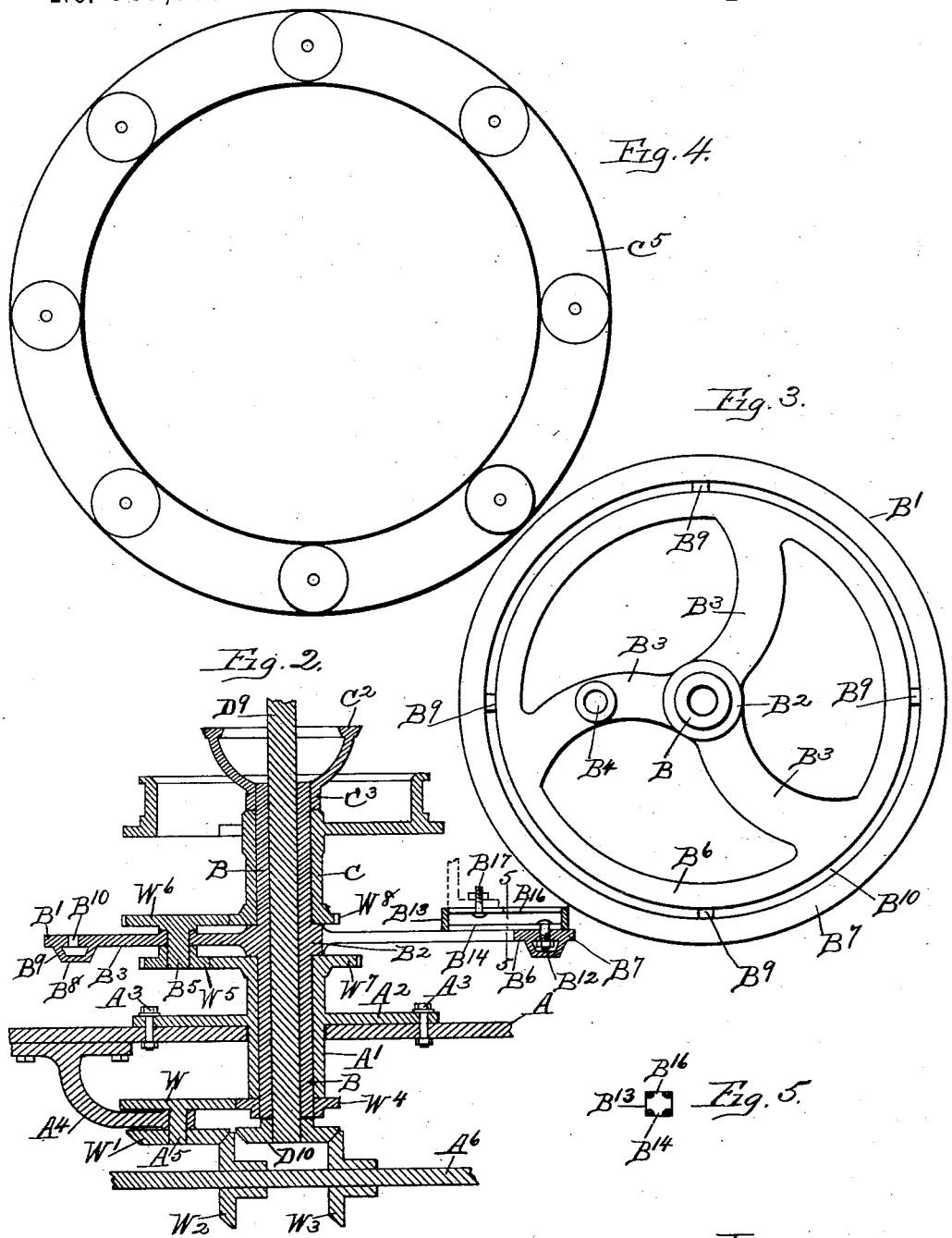

UNITED STATES PATENT OFFICE.

ROBERT W. GORMLY, OF TROY, NEW YORK.

KNITTING-MACHINE.

SPECIFICATION forming part of Letters Patent No. 587,957, dated August 10, 1897.

Application filed March 19, 1897. Serial No. 628,270. (No model.)

*To all whom it may concern:*

Be it known that I, ROBERT W. GORMLY, a citizen of the United States, residing at the city of Troy, county of Rensselaer, and State of New York, have invented certain new and useful Improvements in Knitting-Machines, of which the following is a specification.

The invention relates to such improvements; and it consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1 of the drawings is a view in elevation of my improved knitting-machine. Fig. 2 is a central vertical section of the same with the upper part broken away. Fig. 3 is a plan view of the feed-circle. Fig. 4 is a plan view of the bobbin-circle. Fig. 5 is a cross-section on the broken line 5 5 in Fig. 2.

The principal object of my invention is to materially increase the capacity of a circular-knitting machine; and the invention consists, primarily, of mechanism whereby the needle-cylinder is rotated in one direction and the supports for the sinker-wheel and other working parts which engage the work and needles are revolved in the opposite direction.

A is the stationary frame or table, which is provided with a central aperture adapted to receive the vertically-disposed sleeve A', having an annular horizontal flange $A^2$, which flange is secured to the bed of the table by bolts $A^3$. Fixed to the under side of the table-bed is the depending bracket $A^4$, which supports in suitable bearings a stud or spindle $A^5$, upon which are fixed two gear-wheels W and W'. Beneath the bed of the table a power-shaft $A^6$, provided with belt-pulleys $A^7$, has end bearings in the table-legs $A^8$, shown in part only, and two beveled gears $W^2$ and $W^3$, fixed on such shaft. The beveled gear $W^2$ meshes with gear W', and gear W meshes with a gear $W^4$, fixed upon the sleeve B, contained and rotary within the fixed sleeve A'.

The sleeve B supports the feed-circle B', which rests in a horizontal plane just above the upper end of the fixed sleeve.

I have shown the feed-circle in Fig. 4 provided with a central hub $B^2$, which is adapted to receive and fit the rotary sleeve, and with three spoke-arms $B^3$, which connect the hub and peripheral rim, one of the arms being provided with an aperture $B^4$, adapted to receive and form a bearing for the stud or spindle $B^5$, upon the ends of which are fixed gears $W^5$ and $W^6$.

The lower gear $W^5$ engages a stationary gear $W^7$, fixed upon the stationary sleeve, while the upper gear $W^6$ engages the gear $W^8$, fixed to the sleeve C, rotary upon the rotary sleeve B. Fixed upon the rotary sleeve C is the needle-cylinder C'.

The feed-circle is adapted to carry the feed and controlling mechanisms located exteriorly of the needle-cylinder, consisting of the sinker, cloth, and presser wheels, which, being of the usual well-known form and function, are not shown.

The peripheral part of the feed-circle is composed of two rings $B^6$ and $B^7$, connected by the subjacent bridge-pieces $B^8$, offsetting at $B^9$, so as to leave a channel $B^{10}$ between the rings adapted to receive a bolt $B^{12}$, by which the bracket $B^{13}$ for supporting the usual uprights or stands (not shown) upon which are mounted the feeding and controlling mechanisms is clamped to the circle. The unimpeded channel $B^{10}$ permits of the adjustment of the bracket at any desired part of the circle. The stand-bracket $B^{13}$ is also provided with a clamp-slideway $B^{14}$ and bolt or clamp $B^{12}$, by means of which the bracket can be adjustably secured at differing distances from the center of the circle, also with a separate clamp-slideway $B^{16}$ and bolt or clamp $B^{17}$, by means of which a feed-stand can be adjustably secured to the bracket at differing distances from the center of the circle.

By having the two clamp-slideways separated from and lapping each other, as shown, the clamping mechanism, consisting of the bolts and nuts, can both be moved approximately the entire length of the bracket without interfering with each other, as would be the case if both were located in one slideway.

I am thus able through the gears W, W', and $W^2$ to cause the circle to rotate and carry the feeding and controlling mechanism revolubly around the cylinder, while the cylinder is made to rotate in the opposite direction by means of the gears $W^5$, $W^6$, $W^7$, and $W^8$. The gear $W^7$ being stationary and twice the diameter of gear $W^5$ will cause the latter gear and gear $W^6$ to rotate twice around on its axis while performing one revolution with the circle around the gear $W^8$. This movement will impart to the gear $W^8$ one rotative turn in the opposite direction while gear $W^6$ is making one revoluble turn about it. I am thus able to impart to both the needle-cylinder and the feed-circle rotary movements in opposite directions and of the same angular velocity and thereby double the capacity of the machine—that is, I am able to secure twice the product from the same needle-cylinder without increasing its angular velocity that could be obtained if the support for the feeding and controlling mechanism was made stationary, as heretofore commonly practiced.

Since the blades of the sinker-wheel mesh with the needles as the needle-cylinder rotates, it is likewise obvious that the peripheral movements of those parts of the sinker-wheel which engage the cylinder-needles are not increased by the reverse revoluble movements of the wheel, but remain the same whether the wheel-support is stationary or rotates in the opposite direction.

The revoluble movements of the sinker-wheel about the needle-cylinder if the cylinder was stationary would cause those parts in engagement with the cylinder to remain practically stationary while the engagement continued and those parts of the periphery on the opposite side of the wheel to be given a peripheral speed approximately double the angular velocity of the revoluble movement of the wheel as a whole. The principle is illustrated in the wheel of a moving wagon. That part of the wheel in contact with the ground has a brief interval of rest, while the opposite periphery has a movement of translation twice the speed of the wagon. It follows, therefore, that the peripheral speed of the sinker and presser wheels at their points of engagement with the needles is not affected by the revoluble movement of those supports around the cylinder, whereby a greater number of stitches can be produced on the needle-cylinder without increasing the peripheral speed of the contacting parts on either the cylinder or the cylinder-engaging mechanisms.

The circular frame $C^2$, having a hub $C^3$ fixed upon the upper end of the sleeve B, is adapted to support within the needle-cylinder in the usual place and manner the usual landing and cast-off wheels, (not shown herein,) so that they have the same revoluble movement as the sinker and presser wheels located without the cylinder.

The take-up mechanism may be of any known form, arranged to operate more rapidly to take up the increased product. I have shown the usual take-up frame D supported by the cross-bar $D'$ upon the uprights $D^2$. The frame is provided with the usual rolls $D^3$, $D^4$, $D^5$, and $D^6$ and the cross-bars $D^7$, between which is inserted the actuating-frame $D^8$, fixed upon the shaft $D^9$, provided with a fixed gear $D^{10}$. The gear $D^{10}$ meshes with gear $W^3$ on the driving-shaft, whereby a rotary motion is communicated to the take-up frame.

The frame is suspended from and rotary upon the stud $D^{12}$, upon which is fixed a bevel-gear $D^{13}$. The latter gear is engaged by the pinion $D^{14}$ on crank-shaft $D^{15}$, which shaft operates the roller $D^4$ through the ratchet $D^{16}$, pawl $D^{17}$, pitman-rod $D^{18}$, and crank $D^{19}$ in the usual well-known manner, the knitted fabric being wound upon the roller $D^3$.

As a means for doubling the speed of the take-up I have duplicated this mechanism, as seen on the left-hand side of the take-up frame in Fig. 1. The speed may be increased in any known manner.

The bobbin-circle $C^5$ is supported by the uprights $C^6$, erected from the feed-circle, and carries a series of bobbins, which supply the thread or yarn in the usual manner.

What I claim as new, and desire to secure by Letters Patent, is—

1. In a knitting-machine, the combination with a rotary needle-cylinder, and means for rotating the cylinder in one direction, of a rotary support for the feeding and controlling mechanisms, and means for rotating the support in the opposite direction.

2. In a knitting-machine, the combination with the feed-circle and stand, of an adjustable stand-bracket provided with separate lapping clamp-slideways, bracket-clamping mechanism movable in one of the lapping slideways for adjustably securing the bracket to the circle at differing distances from its center, and stand-clamping mechanism movable in the other of the lapping slideways past the bracket-clamping mechanism for adjustably securing the stand to the bracket, substantially as described.

In testimony whereof I have hereunto set my hand this 26th day of February, 1897.

ROBERT W. GORMLY.

Witnesses:
GEO. A. MOSHER,
WM. C. GEER.